(12) United States Patent
Chen et al.

(10) Patent No.: US 6,947,389 B1
(45) Date of Patent: Sep. 20, 2005

(54) TWO-MODE FOUNDATION FIELDBUS DEVICE CONFIGURATOR

(75) Inventors: Deji Chen, Austin, TX (US); Steve Bonwell, Austin, TX (US); Dan Christensen, Austin, TX (US); DeAnn DelGuzzi, Pflugerville, TX (US); Neil Peterson, Austin, TX (US); Ram Ramachandran, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 1135 days.

(21) Appl. No.: 09/608,815

(22) Filed: Jun. 30, 2000

(51) Int. Cl.[7] .............................. H04J 1/16; H04J 3/16
(52) U.S. Cl. ...................... 370/252; 370/254; 370/465
(58) Field of Search ................................ 370/242, 245, 370/252, 364, 265, 465; 709/228, 233, 253, 709/252, 254, 465

(56) References Cited

U.S. PATENT DOCUMENTS

| | | | |
|---|---|---|---|
| 5,768,119 A * | 6/1998 | Havekost et al. ........... | 709/201 |
| 5,796,721 A * | 8/1998 | Gretta, Jr. .................... | 370/245 |
| 5,978,850 A * | 11/1999 | Ramachandran et al. ... | 709/228 |
| 5,980,078 A * | 11/1999 | Krivoshein et al. ......... | 709/221 |
| 6,076,952 A * | 6/2000 | Gretta et al. ................. | 370/252 |
| 6,304,877 B1 * | 10/2001 | LeBlanc ...................... | 707/100 |
| 6,597,530 B2 * | 7/2003 | Asano et al. ............. | 360/78.14 |
| 6,618,630 B1 * | 9/2003 | Jundt et al. .................... | 700/17 |
| 6,618,745 B2 * | 9/2003 | Christensen et al. ........ | 709/223 |
| 6,742,136 B2 * | 5/2004 | Christensen et al. ........... | 714/5 |

OTHER PUBLICATIONS

Fieldbus, "NI-FBUS™ Monitor User Manual," National Instruments 36 pages, Mar. 1997.
Fieldbus, "NI-FBUS™ Configurator User Manual," National Instruments 55 pages, Aug. 1998.
"FOUNDATION™ Specification Communication Profile," Fieldbus Foundation, 10 pages, 1996-1997.
DeltaV, "Getting Started with Your DeltaV Automation Software," Fisher-Rosemount™, 203 pages, Jul. 2000.
'Practicle Apsects of Fieldbus Device Configuration' ISA EXPO 98, Proceedings of Annual Meeting of the International Society for Measurement and Control, Houston, vol. 5, pp. 31-40, TX, USA, Oct. 19-22, 1998,. ISBN: 1-55617-672-4, with abstract.
Olson and Byers, 'Fieldbus Part 2: Configuration Tools, Removing the Complexity from Start-Up is Goal' inTech, pp. 43-46, Apr. 1999.
International Search Report issued in GB 0115976.3 dated Nov. 21, 2001.

* cited by examiner

*Primary Examiner*—Andy Lee
(74) *Attorney, Agent, or Firm*—Marshall, Gerstein & Borun LLP (57) ABSTRACT

A dual mode configurator operates in an off-line mode to configure Fieldbus devices and/or segments in a typical manner and operates in an on-line mode to reconfigure or set certain parameters of a device when the device is connected to a segment controlled by a different host, without interfering with the on-line operation of the segment. The dual mode configurator can be used to configure an entire segment by configuring both network settings and device settings and, alternatively, can be used to configure device settings without effecting or interfering with the on-line system configuration information such as the network settings of a segment when, for example, a different host device or configuration device is connected to the segment to implement process control activities or to make segment changes.

29 Claims, 3 Drawing Sheets

TWO-MODE FOUNDATION FIELDBUS DEVICE CONFIGURATOR

FIELD OF THE INVENTION

The present invention relates generally to device configurators for use in process control networks and, more specifically, to a Foundation Fieldbus device configurator capable of configuring devices in a process control network.

DESCRIPTION OF THE RELATED ART

Large processes such as chemical, petroleum and other manufacturing and refining processes typically include numerous field devices disposed at various locations in a plant to measure and control process parameters, to thereby effect control of a process. These field devices which may be, for example, sensors such as temperature, pressure, and flow rate sensors as well as control elements such as valves and switches, are typically connected to one or more controllers or host devices which control operation of the field devices to thereby implement process control.

As is known, there are many standard, open communication protocols including, for example, the HART®, PROFIBUS®, WORLDFIP®, LONWORKS®, Device-Net®, and CAN protocols, which enable field devices made by different manufacturers to be used together within the same process control loop. In fact, any field device that conforms to one of these protocols can be used within a process to communicate with and to be controlled by a controller that supports the protocol, even if that field device is made by a different manufacturer than the controller manufacturer. The FOUNDATION™ Fieldbus protocol (hereinafter the "Fieldbus protocol"), provides or enables highly decentralized control by having process control devices, such as valve positioners, transmitters, etc. perform one or more process control functions and then communicating data across a bus structure for use by other process control devices. To implement these control functions, each process control device includes a microprocessor having the capability to perform or implement one or more basic control functions called function blocks as well as having the ability to communicate with other process control devices using the Fieldbus communication protocol. In this manner, field devices made by different manufacturers can be interconnected within a process control loop to communicate with one another and to perform one or more process control functions or control loops.

In the Fieldbus protocol, a Fieldbus segment is a basic network unit of configuration and, generally speaking, there are some Fieldbus devices connected on each such segment. To configure a segment, a Fieldbus configurator, which may be a host device, a controller or a stand-alone device, is connected to the segment and communicates with each of the devices on the segment to configure each of the devices so that, during run-time, these devices perform coordinated and meaningful process control. During this configuration process, the configurator assigns each device a device tag and a device address within the segment, establishes communication relationships with the devices to be used during operation of the segment, schedules the operation of function blocks within the devices, schedules communications between devices, configures alarms and trends to be sent to the operator or other devices, sets user application block parameters, and sets other network parameters. If desired, the Fieldbus configurator can be a host device that performs part of the process control, or can be a temporary device that is connected to the segment to set up the segment and that is then disconnected after the segment is configured.

However, known Fieldbus configurators assume control of a segment to perform device and network configuration activities. In effect, these devices are normally programmed to become a primary link active scheduler (LAS) on the segment at least for the time that the configurator is operating to configure the segment. As a result, it is imperative that only one Fieldbus configurator be connected to the same segment at the same time to successfully configure a segment, although there may be other monitoring devices connected to the segment that do not interfere with the segment. Even if the configurator is not an LAS, disruption can occur due to lack of coordination between the configurator and the communication configuration. Typically, when configuring an entire segment, this constraint is not a problem. However, there are situations where it is desirable to reconfigure or communicate with a device that is on a segment which already has a primary LAS operating to control the segment without interfering with other devices or settings of the segment, including the network settings. Such situations may occur, for example, when an operator is remotely monitoring a segment and a device in the field needs to be calibrated, or when a field engineer needs to see the physical environment to successfully calibrate a device and, therefore, must go out to the device and configure the device without the use of the host. In these cases, the field engineer needs a device configurator that can be easily attached to the segment near the device in the field to configure one or more device parameters without having the configurator device take control of the communications on the segment and without interfering with the on-line system configuration information of the segment or communications on the segment.

As noted above, conventional Fieldbus configurators can be used to reset device parameters on a segment only when connection of the configurator to the segment is guaranteed to cause no disruption of the control loops in the segment. For example, the DeltaV Fieldbus controller automatically assigns an address from 0xF8-0xFB to a device showing up at a default address. 0xF8-0xFB are addresses that may be managed by a host device (LAS) controlling the segment. For just this reason, connecting the DeltaV configurator to the segment to reset certain device parameters while a segment is operating on-line may cause the host device or LAS to lose communications with the device in question, which interrupts the process control loops operating on the segment. Connecting the DeltaV configurator to an online segment will also typically generate many other conflicting problems.

On the other hand, there are also situations in which it is desirable to change the network settings and where such setting changes have no impact on the configuration of a network. For example, when a manufacturer needs to pre-configure a Fieldbus device before shipping it out, the device may be connected to a configurator that sets the device tag in a usual manner. Here, because an operating network is not yet involved, the network settings of the device are not a concern.

SUMMARY OF THE INVENTION

The present invention is directed to a dual mode device configurator that can operate in an off-line mode to configure devices and/or segments, such as Fieldbus segments, in a typical manner and that can operate in an on-line mode to reconfigure or set parameters of a device when that device is connected to a segment having a host or LAS operating thereon. Using the two-mode device configurator as described herein, a user or engineer can use the same device to, in the first case, configure an entire segment and, in the second case, to configure device settings without effecting or interfering with the network settings of a segment when the segment is being used to implement process control activities controlled by a different host or LAS.

According to one aspect of the present invention, a two-mode device configurator includes a processor, a memory, a first set of routines stored in the memory and adapted to be executed on the processor to perform network configuration changes and a second set of routines stored in the memory and adapted to be executed on the processor to perform device configuration changes without making network configuration changes. The device configurator also includes a mode switch which may be switched between a first mode and a second mode and a configuration routine adapted to initiate any of the first set of routines or any of the second set of routines when the mode switch is set to the first mode to thereby configure the network and adapted to initiate any of the second set of routines but not any of the first set of routines when the mode switch is set to the second mode.

The configuration device may include a communication stack adapted to communicate over the segment using the Fieldbus protocol and a communication routine adapted to establish a communication link with a Fieldbus device on the segment without interfering with communication links established with the Fieldbus device by other devices. In this case, the communication routine may include a first portion that determines virtual communication relationship (VCR) entries available for use in the Fieldbus device, a second portion that selects one of the useable VCR entries, a third portion that establishes the communication link using the selected VCR entry and a fourth portion that determines if the communication link using the selected VCR entry is broken and, if so, causes operation of the first, second and third portions of the communication routine to establish a new communication link with the Fieldbus device.

If desired, the first set of routines may include at least one of a device tag assigning routine, a device address assigning routine, a function block scheduling routine and a downloading a communication schedule routine, while the second set of routines may include at least one of a device configuration changing routine, a resource block modifying routine, a transducer block modifying routine and a function block modifying routine.

The configuration device may also include a display and a further routine that determines and displays, via the display, configuration information of the Fieldbus device on the segment and that provides, via the display, a list of the devices currently connected to the segment. Also, the configuration device may include a first improper mode routine that, when the mode switch is set to the first mode, determines if no device is on the segment and, if no device is on the segment, prevents initiation of any of first set of routines. The configuration device may also include a second improper mode routine that, when the mode switch is set to the first mode, searches a set of specified device addresses associated with host devices on the segment and, if a device is at one of the specified device addresses, warns the user of a possible error.

DESCRIPTION OF THE PREFERRED EMBODIMENTS

While a device/network configurator is described in detail in conjunction with a process control network that implements process control functions in a decentralized or distributed manner using the Fieldbus protocol, it should be noted that the device configurator described herein can be used with process control networks that perform control functions using other types of field devices or bus-based communication protocols, including protocols that rely on other than two-wire buses and protocols that support both analog and digital communications.

Figure 1:
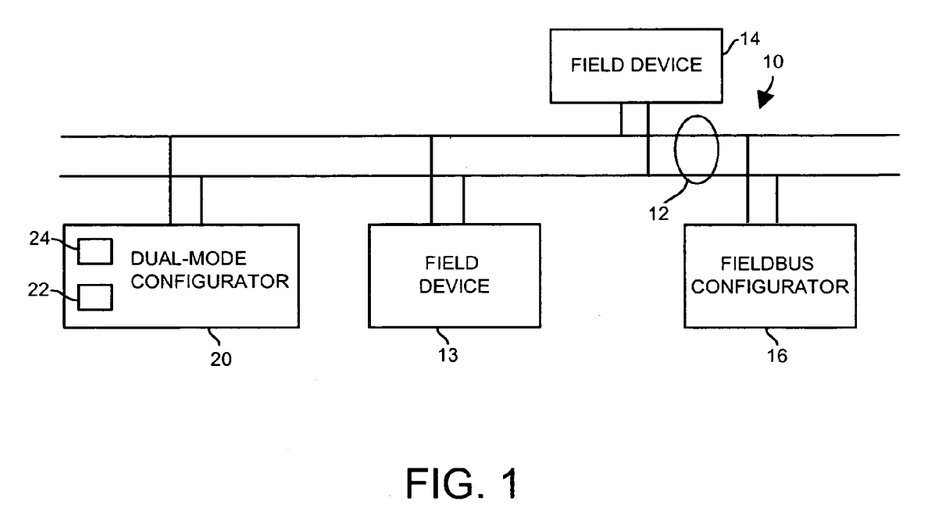
FIG. 1 is a schematic block diagram of an example process control segment using the Fieldbus protocol.

Referring to FIG. 1, a segment 10 of a process control network that uses the Fieldbus communication protocol includes a two-wire bus 12 connected to numerous field devices 13 and 14. A typical or standard Fieldbus configurator 16 and a device/network configurator 20 described in more detail below are also connected to the bus 12. The field devices 13 and 14 may be any type or kind of Fieldbus devices while the Fieldbus configurator 16 may be any standard or existing configurator which can be connected to the bus 12 to configure the segment 10 using the Fieldbus protocol. If desired, more or other devices can be connected to the bus 12 including, for example, other field devices, a controller, host devices, etc.

Before discussing the details of the device/network configurator 20 which can be used to configure the Fieldbus segment 10 or devices on the segment 10 in either an on-line or an off-line mode, a general description of the Fieldbus protocol, field devices configured according to this protocol, and the way in which communication and process control occurs in a process control network that uses the Fieldbus protocol will be provided. However, it should be understood that, while the Fieldbus protocol is a relatively new digital communication protocol developed for use in process control networks, this protocol is known in the art and is described in detail in numerous articles, brochures and specifications published, distributed and available from, among others, the Fieldbus Foundation, a not-for-profit organization headquartered in Austin, Tex. In particular, the Fieldbus protocol, and the manner of communicating with and storing data in devices using the Fieldbus protocol, is described in detail in the manuals entitled Communications Technical Specification and User Layer Technical Specification from the Fieldbus Foundation, which are hereby expressly incorporated by reference herein in their entirety.

Generally speaking, the Fieldbus protocol is an all-digital, serial, two-way communication protocol that provides a standardized physical interface to a two-wire loop or bus interconnecting "field" equipment such as sensors, actuators, controllers, valves, etc. located in an instrumentation or process control environment of, for example, a factory or a plant. The Fieldbus protocol provides, in effect, a local area network for field instruments (field devices) within a process facility, which enables these field devices to perform control functions at locations distributed throughout a process and to communicate with one another before and after the performance of these control functions to implement an overall control strategy. Because, the Fieldbus protocol enables control functions to be distributed throughout a process control network, it reduces the complexity of, or entirely eliminates the necessity of the centralized process controller.

Typically, a configurator, such as the configurator 16 of FIG. 1, is located in one of the devices connected to a Fieldbus segment, such as a host device, and is responsible for setting up or configuring each of the devices (which are "smart" devices in that they each include a microprocessor capable of performing communication and, in some cases, control functions) as well as recognizing when new field devices are connected to the bus, when field devices are removed from the bus, receiving data generated by field devices and interfacing with one or more user terminals, which may be located in a host or in any other device connected to the host in any manner.

The Fieldbus bus 12 supports or allows two-way, purely digital communication and may also provide a power signal to any or all of the devices, such as the field devices 13 and 14. Alternatively, any or all of the devices may have their own power supplies or may be connected to external power supplies via separate wires (not shown). The Fieldbus protocol classifies the devices that can be connected to the bus 12 into three categories, namely, basic devices, link master devices, and bridge devices. Basic devices can communicate, that is, send and receive communication signals on or from the bus, but are not capable of controlling the order or timing of communication that occurs on the bus. Link master devices are devices that communicate over the bus and are capable of controlling the flow of and the timing of communication signals on the bus. Bridge devices are devices configured to communicate on and to interconnect individual segments or branches of a Fieldbus bus to create larger process control networks.

Each of the devices on the segment is capable of communicating over the bus and is capable of independently performing one or more process control functions using data acquired by the device, from the process, or from a different device via communication signals on the bus. Fieldbus devices are, therefore, capable of directly implementing portions of an overall control strategy which, in the past, were performed by a centralized controller. To perform control functions, each Fieldbus device includes one or more standardized "blocks" which are implemented in a microprocessor within the device. In particular, each Fieldbus device includes one resource block, zero or more function blocks, and zero or more transducer blocks. These blocks are referred to as block objects.

A resource block stores and communicates device specific data pertaining to some of the characteristics of a Fieldbus device including, for example, a device type, a device revision indication and indications of where other device specific information may be obtained within a memory of the device. While different device manufacturers may store different types of data in the resource block of a field device, each field device conforming to the Fieldbus protocol includes a resource block storing some data.

A function block defines and implements an input function, an output function, or a control function associated with the field device and, thus, function blocks are generally referred to as input, output, and control function blocks. However, other categories of function blocks such as hybrid function blocks may exist or may be developed in the future. Each input or output function block produces at least one process control input (such as a process variable from a process measurement device) or process control output (such as a valve position sent to an actuation device) while each control function block uses an algorithm (which may be proprietary in nature) to produce one or more process outputs from one or more process inputs and control inputs. Examples of standard function blocks include analog input (AI), analog output (AO), bias (B), control selector (CS), discrete input (DI), discrete output (DO), manual loader (ML), proportional/derivative (PD), proportional/integral/derivative (PID), ratio (RA) and signal selector (SS) function blocks. However, other types of function blocks exist and new types of function blocks may be defined or created to operate in the Fieldbus environment. While the Fieldbus protocol defines function blocks in a particular way, the term function block as used herein is not so limited and refers to any block, processor, software, hardware, etc. configuration that performs a process control function.

A transducer block couples the inputs and outputs of a function block to local hardware devices, such as sensors and device actuators, to enable function blocks to read the outputs of local sensors and to command local devices to perform one or more functions such as moving a valve member. Transducer blocks typically contain information that is necessary to interpret signals delivered by a local device and to properly control local hardware devices including, for example, information identifying the type of a local device, calibration information associated with a local device, etc. A single transducer block is typically associated with each input or output function block.

Each block of a device is capable of operating differently in different modes and each function block is capable of generating alarm or event indications based on predetermined criteria. Generally speaking, blocks may operate in any number of different modes including, for example, an automatic mode in which, for example, the algorithm of a function block operates automatically; an operator mode in which the input or output of, for example, a function block, is controlled manually; an out-of-service mode in which the block does not operate; a cascade mode in which the operation of the block is affected by (determined by) the output of a different block; and one or more remote modes in which a remote computer determines the mode of the block.

Importantly, each block is capable of communicating with other blocks in the same or different field devices using standard message formats defined by the Fieldbus protocol over the Fieldbus bus. As a result, combinations of function blocks (in the same or different devices) may communicate with each other to produce one or more decentralized control loops. Thus, for example, a PID function block in one field device may be connected via the bus to receive an output of an AI function block in a second field device, to deliver data to an AO function block in third field device, and to receive an output of the AO block as feedback to create a process control loop separate and apart from any centralized controller. In this manner, function blocks move control functions out of a centralized controller environment, which allows multi-function controllers to perform supervisory or coordinating functions or to be eliminated altogether. Furthermore, function blocks provide a graphical, block-oriented structure for easy configuration of a process and enable the distribution of functions among field devices from different suppliers because these blocks use a consistent communication protocol.

In addition to containing and implementing block objects, each field device includes one or more other objects including link objects, trend objects, alert objects, and view objects. Link objects define the links between the inputs and outputs of blocks (such as function blocks) both internal to the field device and across the Fieldbus bus. Trend objects allow local trending of function block parameters for access by other devices such as a host or a controller. Trend objects retain short-term historical data pertaining to some, for example, function block parameter and report this data to other devices or function blocks via the bus on a periodic basis. Alert objects report alarms and events over the bus. These alarms or events may relate to any event that occurs within the device or one of the blocks of the device. View objects are predefined groupings of block parameters used in standard human/machine interfacing and may be sent to other devices for viewing on a periodic basis.

To implement and perform communication and control activities, the Fieldbus protocol uses three general categories of technology identified as a physical layer, a communication "stack," and a user layer. The user layer includes the control and configuration functions provided in the form of blocks (such as function blocks) and objects within any particular process control device or field device. The user layer is typically designed in a proprietary manner by the device manufacturer but must be capable of receiving and sending messages according to the standard message format defined by the Fieldbus protocol and of being configured by a user in standard manners. The physical layer and the communication stack are necessary to effect communication between different blocks of different field devices in a standardized manner using the two-wire bus and may be modeled by the well-known Open Systems Interconnect (OSI) layered communication model.

The physical layer, which corresponds to OSI layer 1, is embedded in each field device and the bus and operates to convert electromagnetic signals received from the Fieldbus transmission medium (the two-wire bus) into messages capable of being used by the communication stack of the field device. The physical layer may be thought of as the bus 12 and the electromagnetic signals present on the bus 12 at the inputs and outputs of the field devices.

The communication stack, which is present in each Fieldbus device, includes a data link layer, which corresponds to OSI layer 2, a Fieldbus access sublayer, and a Fieldbus message specification layer, which corresponds to OSI layer 7. There is no corresponding structure for OSI layers 3–6 in the Fieldbus protocol. However, the applications of a Fieldbus device comprise a user layer 8 not defined in the OSI protocol. Each layer in the communication stack is responsible for encoding or decoding a portion of the message or signal that is transmitted on the Fieldbus bus. As a result, each layer of the communication stack adds or removes certain portions of the Fieldbus signal such as preambles, start delimiters, and end delimiters and, in some cases, decodes the stripped portions of the Fieldbus signal to identify where the rest of the signal or message should be sent or if the signal should be discarded because, for example, it contains a message or data for function blocks that are not within the receiving field device.

The data link layer controls transmission of messages onto the bus and manages access to the bus according to a deterministic centralized bus scheduler called a link active scheduler, to be described in more detail below. The physical layer removes a preamble from the signals on the transmission medium and may use the received preamble to synchronize the internal clock of the field device with the incoming Fieldbus signal. Likewise, the physical layer converts messages on the communication stack into physical Fieldbus signals and encodes these signals with clock information to produce a "synchronous serial" signal having a proper preamble for transmission on the two-wire bus. During the decoding process, the physical layer recognizes special codes within the preamble, such as start delimiters and end delimiters, to identify the beginning and the end of a particular Fieldbus message and may perform a checksum to verify the integrity of the signal or message received from the bus. Likewise, the physical layer transmits Fieldbus signals on the bus 12 by adding start and end delimiters to messages on the communication stack and placing these signals on the transmission medium at the appropriate time.

The Fieldbus message specification layer allows the user layer (i.e., the function blocks, objects, etc. of a field device) to communicate across the bus 12 using a standard set of message formats and describes the communication services, message formats, and protocol behaviors required to build messages to be placed onto the communication stack and to be provided to the user layer. Because the Fieldbus message specification layer supplies standardized communications for the user layer, specific Fieldbus message specification communication services are defined for each type of object described above. For example, the Fieldbus message specification layer includes object dictionary services which allows a user to read an object dictionary of a device. The object dictionary stores object descriptions that describe or identify each of the objects (such as block objects) of a device. The Fieldbus message specification layer also provides context management services which allow a user to read and change the status of virtual communication relationships (VCRs) described hereinafter. Still further, the Fieldbus message specification layer provides variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To allow or enable operation of these layers, each Fieldbus device includes a management information base (MIB), which is a database that stores VCRs, dynamic variables, statistics, link active scheduler timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the VFD. A device description, which must typically be tokenized to be used by a host, stores information that describes data and methods that operate on data of a device, including human interface for functions such as calibration and diagnostics.

As will be understood, to implement any control strategy using function blocks distributed throughout a process control network, the execution of the function blocks must be precisely scheduled with respect to the execution of other function blocks in a particular control loop. Likewise, communication between different function blocks must be precisely scheduled on the bus so that the proper data is provided to each function block before that block executes.

The way in which different field devices (and different blocks within field devices) communicate over the Fieldbus transmission medium will now be described. For communication to occur, one of the link master devices on a segment of the bus operates as a link active scheduler (LAS)

which actively schedules and controls communication on the associated segment of the bus. The LAS for each segment stores and updates a communication schedule (a link active schedule) containing the times that each function block of each device is scheduled to start periodic communication activity on the bus and the length of time for which this communication activity is to occur. While there may be one and only one active LAS device on each segment of the bus, other link master devices may serve as backup LASs and become active when, for example, the current LAS fails.

Generally speaking, communication activities over the bus are divided into repeating macrocycles, each of which includes one synchronous communication for each function block active on any particular segment of the bus and one or more asynchronous communications for one or more of the function blocks or devices active on a segment of the bus. During each macrocycle, each of the function blocks active on a particular segment of the bus executes, usually at a different, but precisely scheduled (synchronous) time and, at another precisely scheduled time, publishes its output data on that segment of the bus in response to a compel data command generated by the appropriate LAS. Preferably, each function block is scheduled to publish its output data shortly after the end of the execution period of the function block. Furthermore, the data publishing times of the different function blocks are scheduled serially so that no two function blocks on a particular segment of the bus publish data at the same time. During the time that synchronous communication is not occurring, each field device is allowed, in turn, to transmit alarm data, view data, etc. in an asynchronous manner using token driven communications. The execution times are stored in the management information base (MIB) of the device in which the function block resides while, as noted above, the times for sending the compel data commands to each of the devices on a segment of the bus are stored in the MIB of the LAS device for that segment. These times are typically stored as offset times because they identify the times at which a function block is to execute or send data as an offset from each macrocycle repeat. The macrocycle is repeated continuously beginning from an "absolute link scheduling time," which is known by all of the field devices connected to the bus 12.

Thus, to effect communications during each macrocycle, the LAS sends a compel data command to each of the devices on the bus segment according to the list of transmit times stored in the link active schedule. Upon receiving a compel data command, a function block of a device publishes its output data on the bus 12. Because each of the function blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block.

After the LAS has sent a compel data command to each of the function blocks on particular segment of the bus and during the times that function blocks are executing, the LAS may cause asynchronous communication activities to occur. To effect asynchronous communication, the LAS sends a pass token message to a particular field device. When a field device receives a pass token message, that field device has full access to the segment and can send asynchronous messages, such as alarm messages, trend data, operator set point changes, etc. until the messages are complete or until a maximum allotted "token hold time" has expired. Thereafter the field device releases the segment bus and the LAS sends a pass token message to another device. This process repeats until the end of the macrocycle or until the LAS is scheduled to send a compel data command to effect synchronous communication. Of course, depending on the amount of message traffic and the number of devices and blocks coupled to any particular segment of the bus, not every device may receive a pass token message during each macrocycle.

Field devices are able to publish or transmit data and messages over the bus using one of three virtual communication relationships (VCRs) defined in the Fieldbus access sublayer of the stack of each field device. A client/server VCR is used for queued, unscheduled, user initiated, one to one, communications between devices on the bus. Such queued messages are sent and received in the order submitted for transmission, according to their priority, without overwriting previous messages. Thus, a field device may use a client/server VCR when it receives a pass token message from an LAS to send a request message to another device on the bus. The requester is called the "client" and the device that receives the request is called the "server." The server sends a response when it receives a pass token message from the LAS. The client/server VCR is used, for example, to effect operator initiated requests such as set point changes, tuning parameter access and changes, alarm acknowledgments, and device uploads and downloads.

A report distribution VCR is used for queued, unscheduled, user initiated, one to many communications. For example, when a field device with an event or a trend report receives a pass token from an LAS, that field device sends its message to a "group address" defined in the Fieldbus access sublayer of the communication stack of that device. Devices that are configured to listen on that VCR will receive the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus when the publisher device receives a compel data message from the LAS or from a subscriber device. The publisher/subscriber relationships are pre-configured and are defined and stored within the Fieldbus access sublayer of the communication stack of each field device.

To assure proper communication activities over the bus, each LAS periodically sends a time distribution message to all of the field devices connected to a segment of the bus, which enables the receiving devices to adjust their local application time to be in synchronization with one another. Between these synchronization messages, clock time is independently maintained in each device based on its own internal clock. Clock synchronization allows the field devices to time stamp data throughout the Fieldbus network to indicate, for example, when data was generated.

Furthermore, each LAS (and other link master device) on each bus segment stores a "live list," which is a list of all the devices that are connected to that segment of the bus, i.e., all of the devices that are properly responding to a pass token message. The LAS continually recognizes new devices added to a bus segment by periodically sending probe node messages to addresses that are not on the live list. In fact, each LAS is required to probe at least one address after it has completed a cycle of sending pass token messages to all of the field devices in the live list. If a field device is present at the probed address and receives the probe node message, the device immediately returns a probe response message. Upon receiving a probe response message, the LAS adds the device to the live list and confirms by sending a node activation message to the probed field device. A field device remains on the live list as long as that field device responds properly to pass token messages. However, an LAS removes a field device from the live list if the field device does not, after three successive tries, either use the token or immediately return the token to the LAS. When a field device is added to or removed from the live list, the LAS broadcasts changes in the live list to all the other link master devices on the appropriate segment of the bus 12 to allow each link master device to maintain a current copy of the live list.

Referring again to FIGS. 1 and 2, the two-mode device/network configurator 20, which can be used to configure the segment 10 or a device on the segment 10 while other configurators or host devices either are or are not attached to the segment 10, is illustrated. More particularly, the configurator 20 can be connected to the bus 12 of the segment 10 (or directly to a device on the segment 10) at any desired time or location and can be used in a first mode, i.e., an off-line mode, to configure any of the devices on the segment 10 as well as to configure network settings within the segment, similar to the standard Fieldbus configurator 16. Additionally, the configurator 20 can be used in a second mode, i.e., an on-line mode, wherein the configurator 20 can be connected to the bus 12 or to a device to configure device specific parameters or settings without taking control of the bus 12 and without effecting the network settings of the devices connected to the bus 12. In this manner, the configurator 20 can communicate with a device and can reconfigure a device while that device and/or other devices are operating on-line to perform process control, but without interfering with network settings of the segment 10 or other communications occurring on the segment 10. Generally speaking, network settings are parameters that all devices agree upon to communicate with each other, like the maximum response delay, maximum inactive time to claim LAS delays, etc.

Figure 2:
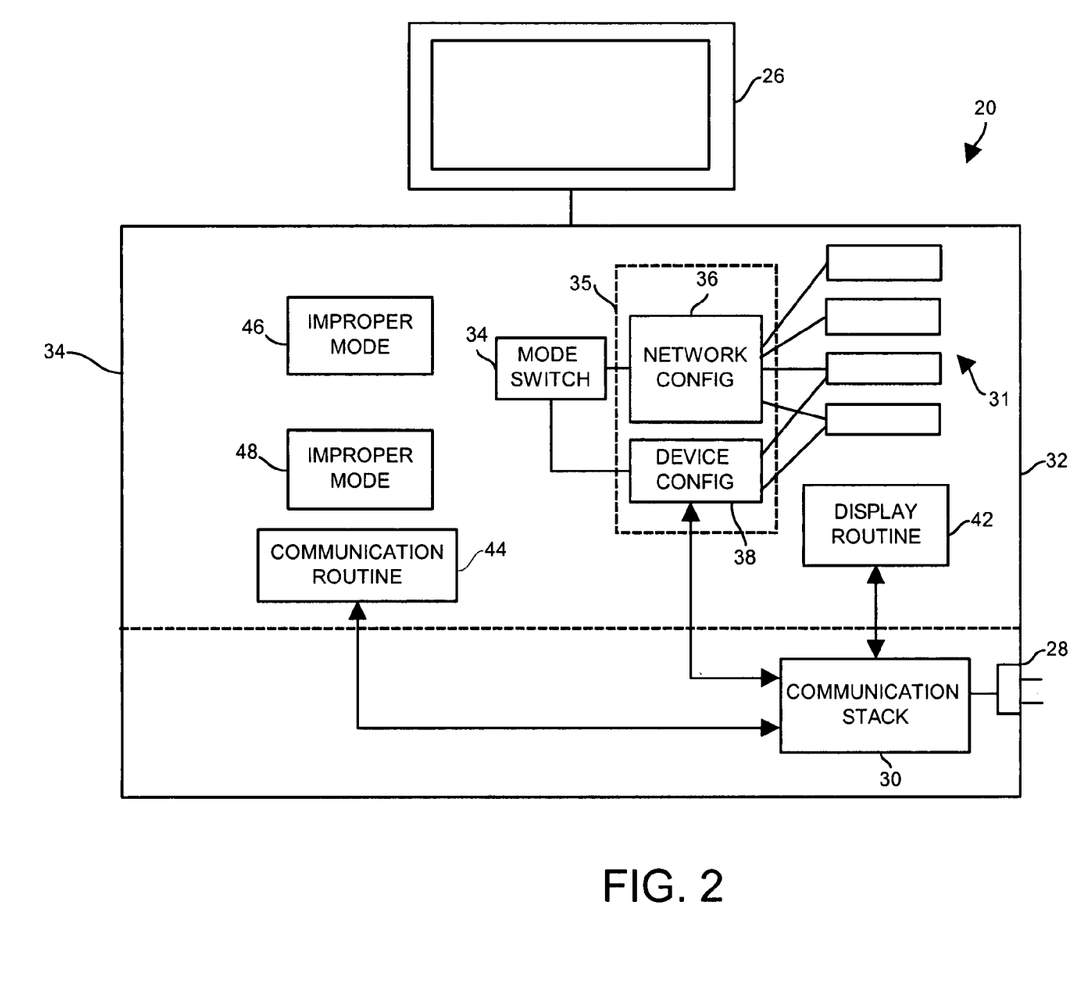
FIG. 2 is a block diagram of an example two-mode device configurator which can be used on the segment of FIG. 1.

As illustrated in FIG. 1, the configurator 20, which may be a host device, a lap top or a portable computer, or which may be any other type of computing device, includes a processor 22 and a memory 24 which stores programs, routines and data executed on or used by the processor 22. As illustrated in FIG. 2, the device 20 may also include a display 26, which may be any desired type of display, such as an LED, an LCD, plasma display panel, etc. The architecture of the configurator 20 includes a physical layer 28 which is adapted to connect to and to disconnect from the Fieldbus bus 12 to enable communications over the bus 12 in the standard manner and a Fieldbus communication stack 30 which operates in a standard manner to perform Fieldbus communications. Generally speaking, the physical layer 28 and the communication stack 30 are standard Fieldbus layers as used in any Fieldbus device. A number of programs or subroutines 31 are stored in the memory 24 in a user layer 32 and are implemented on the processor 22 to perform different types of communications and operations over the bus 12.

The configurator 20 also includes a mode switch 34, which may be, for example, a hardware switch or a software switch. The mode switch or setting 34 controls the mode of the configurator 20 to be either in an off-line mode, in which a configurator 35 operates as a standard Fieldbus configurator by assuming control of the bus 12 and configuring network settings using the routines 31 as necessary, or in an on-line mode, in which a configurator 35 uses only a limited number of the routines or procedures 31 to thereby assure that the implemented configuration activities do not interfere with on-line system configuration information, which includes network settings and other on-line configuration information such as LAS schedules, etc.

If desired, the configuration 35 may include a first configuration routine 36 that operates as a network configurator and that has access to all of the routines 31 and a second configuration routine 38 which operates as a device configurator that has access to only a portion of the routines 31. In particular, the set of routines or procedures 31 includes two basic types of routines, including a first type which controls or affects network settings and a second type which controls device settings without affecting on-line system configuration information. All of the routines 31 are available to the off-line configurator 36 to perform standard Fieldbus configuration activities. These activities (and routines or procedures 31) include, for example, assigning device tags and device addresses within the segment, establishing communication relationships with the devices to be used during operation of the segment in a standard manner, scheduling the operation of function blocks within the devices, scheduling communications between devices, configuring alarms and trends to be sent to the operator or other devices, setting user application block parameters, and setting other network parameters. Thus, in the off-line mode, the configurator 20 has all of the functionality of a typical Fieldbus configurator that configures both the Fieldbus segment and the devices on the segment and, as such, assumes full control of the segment 10 when operating. Also, in the off-line mode, the configurator 36 temporarily schedules all the function blocks in the device being configured and clears its changes once the user is done with the device.

However, when the mode switch or setting 34 is set to the on-line mode, the configurator 38 does not assume control of the segment 10 or perform communication or other activities that interfere with the on-line system configuration information of the segment 10. This on-line mode may be used, for example, when there is a need to configure only one or more of the devices on the segment to perform, for example, device tuning or diagnostics on the segment 10 when a host device is already running live process control on the segment 10. In the on-line mode, certain of the routines or procedures 31 (i.e., the first set of routines) are made unavailable to the on-line configurator 38, which enables the configurator 20 to operate simultaneously with other configurators or host devices, e.g., an LAS, operating on the segment 10.

In particular, in the on-line mode, the on-line configurator 38 will not change a device tag, change a device address, schedule function blocks, or take other actions normally controlled by the LAS of a live segment and normally set by a configuration device. Instead, the on-line configurator 38 only configures device parameters that are closely associated with the device itself, instead of parameters that effect the segment 10 or the control loops in the segment 10. The settings that the on-line configurator 38 can configure (i.e., the routines 31 to which it has access) include modifying static parameters of a resource block, a transducer block, and a function block of a device. The routines 31 that the on-line configurator 38 does not have access to or use include scheduling function blocks, assigning device addresses, setting network parameters, creating control loops, downloading communication schedules and clearing device configurations. Thus, in the on-line mode, the device configurator 20 only changes static block parameters. Further, the device configurator 20 may include a display routine 42 that accesses and displays a list of devices in the segment, a list of resource blocks, transducer blocks, and function blocks in a device, the read and write parameters of those blocks, and communication statistics on the display 26, all using standard Fieldbus communications or requests.

In the on-line mode, the configurator 35 uses a special communication routine 44 to establish communications with a device being reconfigured. This routine 44, which is described in more detail below, is used to enable the configurator 35 to communicate with a device without destroying communication links established or used by other configuration devices or LASs connected to the segment 10. The communication procedure 44 is used because it is desirable to have the configurator 20 communicate over the bus 12 to the device being altered by only establishing the communication connections necessary to work on the device being altered, which reduces network traffic. Further, in the on-line mode, the configurator 20 need not read device detail information unless the user wants such information, which also generates less segment traffic.

When initially connected to the segment 10, the on-line configurator 38 is configured to present itself to the segment 10 as a guest device, to use the display routine 42 to recognize and display the devices on the segment 10 to the user via, for example, the display 26, and to communicate with a particular device on the segment when and if a user selects this device. The on-line configurator 38 only configures devices at certain addresses (such as at field device addresses, but not at host or guest addresses) and the user may determine the set of addresses at which a device is configurable. The information displayed to the user may be displayed in any form but, in one embodiment, is displayed in a form similar to the Windows® NT Explorer.

During operation, the user decides which mode to use by using the mode switch 34. In the off-line mode, the configurator 20 temporarily assigns a device on the segment an address if necessary. However, in the on-line mode, certain functionality of the device configurator 20, namely the first set of routines identified above, is disabled to avoid interference with the host device. To prevent a user from accidentally connecting to a live segment when the device configurator 20 is set in the off-line mode, the device configurator 20 includes a first improper mode routine 46 which checks to see if a device is attached to one or more addresses typically used by a standard device configurator, host or LAS and, if a device is at one of those addresses, warns the user that another configurator exists on the segment. These addresses may be those used by Fieldbus configurators and are typically provided by the user. The configurator 20 also includes a second improper mode routine 48 that halts operation of the off-line configurator 36 if no device is detected on the segment to which the configurator 20 is attached. In this case, the off-line configurator 36 will not present itself on the segment and instead, the user must re-activate the configurator 36 upon selection. The routine 48 prevents a user from accidentally re-connecting the off-line device configurator 36 to a live segment after working on an off-line segment without shutting down the configurator 20 because, when the configurator 36 is disconnected from a segment, the routine 48 will detect no devices on the segment and will halt the operation of the device/network configurator 20 until reset by the user.

In comparison, known Fieldbus configurators assume the total control of the segment. If there are two of any of them on the same segment, they may conflict with each other. For example, both will automatically try to assign a permanent address to a device to communicate with that device. Even if configured to be a basic device, some known configurators will still assign addresses. However, the configurator 20, in the on-line mode, can co-exist with known configurators or with other two-mode configurators 20 running on the same segment. Also, while standard or known Fieldbus monitoring tools can co-exist on a live segment, these tools cannot access device information.

To perform non-intrusive communications when connected to the bus 12 in the on-line mode, the communication routine or algorithm 44 is designed to enable communications with a device in a segment in which another host or LAS device is operating without overwriting or destroying the communication parameters established by the LAS controlling the segment. In particular, the communication routine 44 uses a non-intrusive virtual communication relationship scheme to access the user application in a device.

Typically, to configure a Fieldbus segment, a host device has total control of the whole segment and all of the devices on the segment. To access the function block information in each device, the host can choose almost any available Virtual Communication Relationship (VCR) entry and can use any local selector. Furthermore, the host does not need to clean up changes made to the devices. As a result, two Fieldbus configurators can not normally configure the same device simultaneously because of the way that these devices write the device VCR entries in the device.

The communication routine or process 44 described herein is capable of accessing and configuring a device on the segment while another host device is configuring or controlling the network in the mean time. The routine 44 writes only minimally into the device VCR entry to create communication with the device and, furthermore, recovers communications when the VCR entry being used is destroyed by the other host. Still further, the communication routine 44 leaves minimum changes to the VCR entry, which is re-usable after the routine 44 stops or ends communication.

Figure 3:
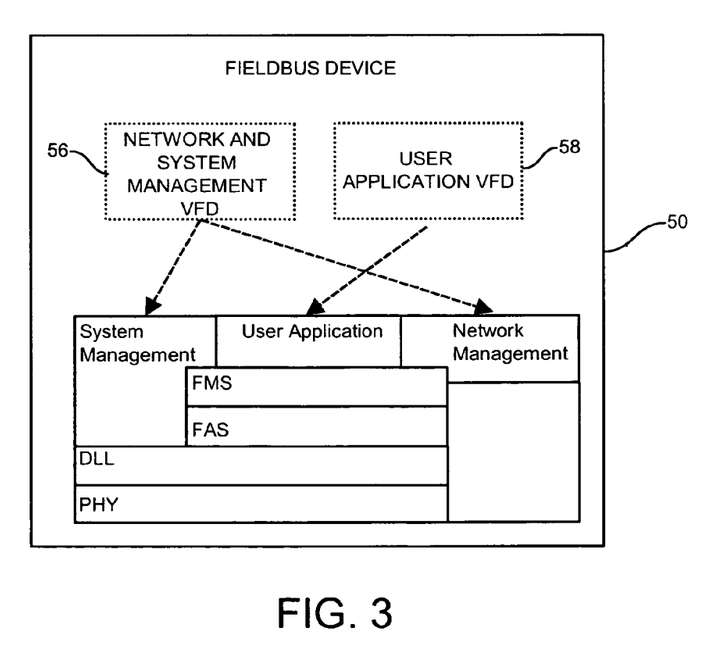
FIG. 3 is a block diagram of a communication hierarchy used within a typical Foundation Fieldbus device.

As indicated above, the Foundation Fieldbus network communication is realized through different layers. A typical Fieldbus device 50 is illustrated in FIG. 3 and, from the bottom to the top, includes a Physical Layer (PHY), a Data Link Layer (DLL), a Fieldbus Access Sublayer (FAS), a Fieldbus Message Specification Layer (FMS), and a User Application Layer. The Fieldbus device 50 is represented as one or more Virtual Fieldbus Devices (VFD) on the network and each virtual device has a system VFD 56 that contains system and network management information and one or more user application VFDs 58 that contain function block information.

The information in a VFD is organized in an Object Dictionary (OD). A client on the network or segment accesses the ODs through Virtual Communication Relationship (VCR) defined at the FMS layer. The client can be another device or other monitoring/configuring equipment on the network and, in particular, may be the configurator 20. The VCR parameters are stored at the VCR entries at both ends of the connection and include the local address, the remote address, the VFD to access, the VCR type and communication coefficients. Table 10 of the FF-940-1.4 Fieldbus standard provides the different types of VCRs and their parameters in the Fieldbus protocol. In general, the address includes a link number (which relates to the segment on which the device is located), a node address in the link (which is unique to each device on a segment), and a VCR selector which relates to different parts or sections of the device. A connection is established between two devices when their VCR entry parameters match.

Generally speaking, a client first issues a connection establishment request to the device. The request indicates which local address to use in the device and the device then locates the local VCR entry that matches this local address and designates this local address for the VCR connection. A VCR entry matches a local address if its local selector parameter equals the same value in the local address. The Fieldbus Foundation predefines a local selector for accessing System Management OD. To access the user application OD, the client must first find a usable VCR entry in the device, change its parameters if necessary, and then establish a connection with the entry.

As is known, the VCR entries are stored in the System OD. A device has a fixed number of VCR entries and some of the entries may be hard coded, i.e., the types, local selector value, etc. are pre-set. Also, some of the VCR entries may be empty, in which case the client can define any VCR at this entry. A device has a pre-configured VCR entry with the reserved local selector defined by the Fieldbus Foundation for system OD access. A client does not need to locate this VCR entry to access the system OD. It can issue a connection establishment request with this reserved local selector.

Typically, there is only one host device in the network that fully configures the devices. This host or LAS device overwrites VCR entries for its own purpose and there is no need to worry if the VCR is available or if its parameters are appropriate. An invalid local selector or a duplicated local selector is avoided because the host device has total control and can write into all the VCR entries. In most cases, the host device does not rollback its changes made to the device VCR entries. Of course, for other monitoring devices that do not need to create VCR connections to the device, the changes made by the host device are not an issue.

However, if two clients such as two configurators try to access the user application OD of a device at the same time, they may or may not succeed depending on whether they interfere with each other's VCR entries. The goal of the communication routine 44 described herein is to guarantee a client's access to the device user application regardless of whether another host on the network exists. Furthermore, the routine 44 tries to leave as small of a footprint in the VCR entries as possible after the client leaves the network. As a result, the routine 44 may be used in a non-host configuring client that co-exists with a host device, such as the on-line mode configurator described above, in an off-line configurator preparing a device for service, or even in a traditional host device that configures an entire Fieldbus segment.

Figure 4:
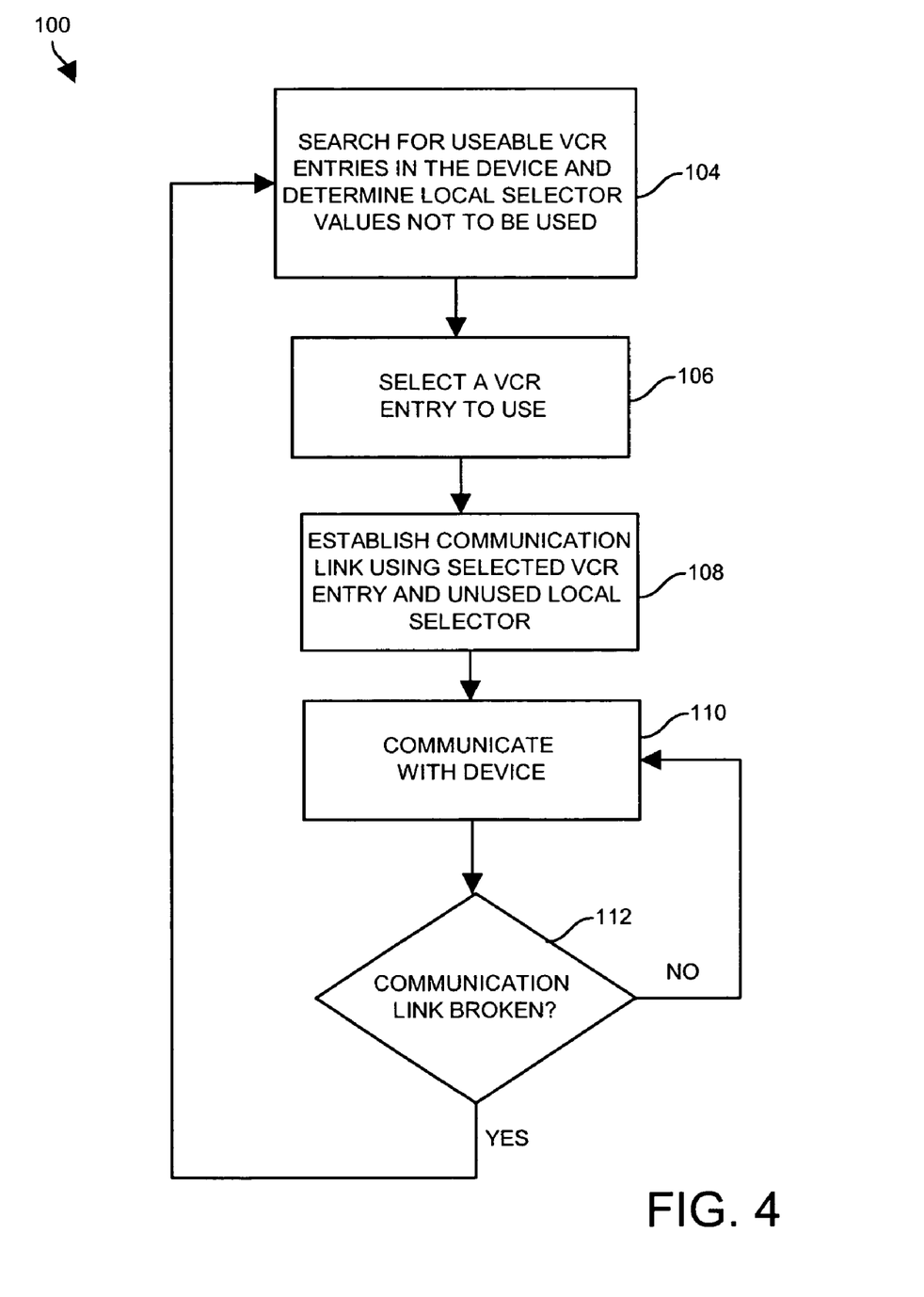
FIG. 4 is a flow chart illustrating the steps performed by the device configurator of FIG. 2 to establish and maintain non-intrusive communications with a device on a Fieldbus segment.

Referring now to FIG. 4, a communication algorithm 100 used by the routine 44 is illustrated in flow chart form. For the purposes of this discussion, the type of the VCR for the user application OD access is Client/Server, the device being accessed is referred to as the server and the client is the client requesting access to the device, in this case, the device/network configurator 20 operating in the on-line mode. A block or step 104 first initializes configuration data by creating or accessing a list of selector values not to be used for the communication and by determining the VCRs available for use in the device. The selector values not to be used are the selector values already being used by the VCRs being used in the device for other communications over the bus 12. Typically, in the Fieldbus protocol, the value of the local selectors should be in the range 0x20-0xF7. However, the step 102 explicitly excludes certain addresses which are known to be used by other host devices to thereby prevent possible conflict with host devices on the network. For example, if the algorithm 100 or a user knows that a fixed local selector is used by other host devices, this selector value can put into the list of selector values not to be used and the algorithm 100 will not use this selector for communicating with the device. This action not only prevents possible conflict with the host which uses that selector value, but also reduces the need to recreate VCR connections later if the other host clears the temporary connection being made by the client device (i.e., the device configurator 20).

The block 104 also determines a number of usable VCR entries in the server (the device being accessed) from which to choose. Of course, there may be more usable VCR entries in the server device than are necessarily needed. In any event, the step 104 decides how many of the VCR entries that exist within the device can be used. The step of determining local selectors not to use may be performed contemporaneously with the step of determining available VCR entries, if desired, as the selector value for each VCR entry determined not to be useable may be placed in the list of selector values not to be used. In any event, the more VCR entries to choose from, the more memory space that is needed, but the less the possibility that there will be conflict with other configurators or host devices. Of course, the user may set these parameters (i.e., how many selectors and VCR entries to store) or they may be pre-configured and stored in memory for use by the algorithm 100.

In one embodiment, the step 104 reads each VCR entry in the device and for each entry takes the following steps. If the VCR entry is an empty entry, save its index number and mark it as empty. If the VCR entry is a non-usable entry, save its local selector value in the list of non-useable local selectors. Otherwise, the VCR entry must be a pre-set and usable entry. In this case, save all of the VCR entry parameters. A usable entry may be a hard coded entry or may be a usable one set by other clients previously.

Thus, in general, the step 104 looks at each VCR entry in the server device and determines if each of the VCR entries is either an empty entry, or a pre-configured entry. An empty entry can be configured for the desired communication connection and, if so, the step 104 saves the index number of each empty entry. For a pre-configured entry, the step 104 first checks to determine if the entry is of the type that can be used for the desired communication and determines if this entry is free to be used. If the entry is usable and is free, the step 104 saves the parameters of this entry. For any pre-configured entry, the step 104 may save the local selector of the entry to be used later when the algorithm 100 needs to choose a local selector. Certain Fieldbus devices have only pre-configured VCR entries and, thus, the algorithm 100 does not assume that there is always an empty entry to use but, instead, checks for pre-configured entries.

Next a block or step 106 selects a VCR entry of the device from among the saved usable VCR entries. If no usable VCR entry exists, the algorithm 100 fails and the client can not access the device user application OD for the time being. In effect, after the algorithm 100 has gone through all of the VCR entries of the server device and has saved a set of usable VCR entries, the step 106 decides which VCR entry to use. To reduce the possibility of conflict, a random algorithm is used to select one of the useable entries. Two principles may be observed here. First, the step 106 tries to avoid the first usable entry if there are enough usable ones, as most configurators or host devices tend to use the first one they encounter. Second, the randomness can be tied to the network address or some other unique value for the client, which will help avoid a situation in which two clients using the algorithm 100 select the same VCR entry. The randomness is important because the VCR entry selected may be still be taken over by other devices, in which case the connection using the VCR entry is lost and must be reestablished. The less this situation occurs, the faster and better the communication with the server device will be.

Next, a block or step 108 establishes a VCR connection with the device in a standard manner using the selected VCR entry and one of the non-used selector values. Communication then begins at a step 110. For an empty VCR entry, the step 108 writes into the entry the parameter values requested for the server side VCR. For a usable entry, client side parameters are set according to the values in the server device. The local selector used for an empty entry is chosen so that it is not one of the ones prohibited (i.e., on the list of non-useable local selectors) or being used by another entry. In both cases, the remote address parameter in the device is left as 0. The goal is to make the VCR entry in the server device re-usable by other configurators or hosts once the algorithm 100 relinquishes the connection.

As an alternative, the step 108 may write the client address into the device VCR entry and later set it back to its original setting after the configurator 20 is finished. However, this approach requires a reset to be accomplished at the end of the communication procedure but before the configurator 20 is disconnected from the segment. When the configurator 20 is frequently hooked to the network to perform some communication for a short amount of time, the user typically wants to be able to disconnect from the network without worrying about a reset. Also, the reset is sometimes not possible due to loss of communication with the device.

In any event, after the communication link is made, the configurator 20 may run the routines or procedures 31 to change device settings as described above with respect to FIG. 2 and to communicate with the device as illustrated at the block or step 110. During communication, however, a block or step 112 determines if the communication connection is broken (usually by seeing if a time out period expires) and, if so, causes the communication algorithm 100 to repeat steps 104–110. As noted above, the client address is not written into the device VCR entry, which allows the same entry to be used later by other devices. One drawback to this approach is that other configurators or hosts may mistake the entry being used as still usable while the configurator 20 is communicating using the VCR entry and these other devices may take over the VCR entry. The use of a random selection in the step 106 tries to avoid this possibility but does not always prevent it. Thus, in the rare event that the connection is terminated by a different device taking over the VCR entry, the algorithm 100 re-initializes the connection, by finding another VCR entry. The importance of the step 112 lies not only in VCR entry conflict, but also in cases where the host device clears all VCR entries in its network configuration process.

Thus, as will be understood, the algorithm 100 provides a non-intrusive VCR creation method to access user application/function block information in a Fieldbus device. Traditional Fieldbus configurators do not perform non-intrusive connections because, in essence, they can overwrite the VCR entries in the device to suit their needs. As a result, in these devices, there is no problem of finding a usable entry, no concern of connection interruption, and no need to reset the VCR entries. However, all these factors need to be dealt with when trying to connect more than one configurator on the same network or segment.

Furthermore, the algorithm 100 works for both single-configurator and multi-configurators cases so that more than one configurator can simultaneously access the device user application and process information. The algorithm 100 is not intrusive and it does not interrupt any existing device VCR connections. As a result, the configurator using the algorithm 100 can be disconnected from the network at any time without leaving the VCR entry in a non-usable state, which means that the entry can be readily used by other devices. Furthermore, the algorithm 100 determines a local selector on the fly. Thus, if using an empty VCR entry, the local selector is not fixed but, instead, is chosen so that it will not conflict with any existing entries. Because the algorithm 100 looks for pre-configured or empty VCR entries, it can be used with different types of Fieldbus devices, including devices with or without empty VCR entries.

While the configurator 20 has been described herein as including functionality implemented by one or more programs or routines in a processor and memory, it will be understood that the configurator 20 can be constructed as any type of device and that the different elements of the configurator 20 could be produced in or implemented in hardware, firmware or software stored on any type of computer memory, disk or other storage device. If implemented in software, the configurator 20 could be programmed using any desired programming language, and may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or a device within a process control system via any known or desired delivery method including, for example, on a computer readable disk or other transportable computer storage mechanism or modulated over a communication channel such as a telephone line, the Internet, a satellite link, a cellular link, etc. (which are viewed as being the same as or interchangeable with providing such software via a transportable storage medium).

Furthermore, while the present invention has been described with reference to specific examples, which are intended to be illustrative only, and not to be limiting of the invention, it will be apparent to those of ordinary skill in the art that changes, additions or deletions may be made to the disclosed embodiments without departing from the spirit and scope of the invention.

What is claimed is:

1. A configuration device for use configuring a Foundation Fieldbus segment, comprising:
    a processor;
    a memory;
    a first set of routines stored in the memory and adapted to be executed on the processor to perform network configuration changes;
    a second set of routines stored in the memory and adapted to be executed on the processor to perform device configuration changes without making network configuration changes;
    a mode switch which may be switched between a first mode and a second mode; and a configuration routine stored in the memory and adapted to be executed on the processor to initiate any of the first set of routines or any of the second set of routines when the mode switch is set to the first mode to thereby configure the network and adapted to initiate any of the second set of routines but not any of the first set of routines when the mode switch is set to the second mode.

2. The configuration device of claim 1, further including a communication stack adapted to communicate over the segment using the Fieldbus protocol.

3. The configuration device of claim 2, further including a communication routine stored in the memory and adapted to be executed on the processor to establish a communication link with a Fieldbus device on the segment without interfering with communication links established with the Fieldbus device by other devices.

4. The configuration device of claim 3, wherein the communication routine includes a first portion that determines virtual communication relationship (VCR) entries available for use in the Fieldbus device and not being used by other devices, a second portion that selects one of the useable VCR entries and a third portion that establishes the communication link using the selected VCR entry.

5. The configuration device of claim 4, wherein the third portion uses a local selector to establish the communication link using the selected VCR entry.

6. The configuration device of claim 5, wherein the communication routine further includes a fourth portion that determines if the communication link using the selected VCR entry is broken and, if so, causes operation of the first, second and third portions of the communication routine to establish a new communication link with the Fieldbus device.

7. The configuration device of claim 4, wherein the second portion is adapted to randomly select one of the useable VCR entries.

8. The configuration device of claim 1, wherein the first set of routines includes at least one of a device tag assigning routine, a device address assigning routine, a function block scheduling routine and a downloading a communication schedule routine.

9. The configuration device of claim 1, wherein the second set of routines includes at least one of a device configuration changing routine, a resource block modifying routine, a transducer block modifying routine, and a function block modifying routine.

10. The configuration device of claim 9, further including a display and a further routine that determines and displays, via the display, configuration information of the Fieldbus device on the segment.

11. The configuration device of claim 10, wherein the further routine determines and displays, via the display, a list of the devices currently connected to the segment.

12. The configuration device of claim 1, wherein the configuration routine includes an improper mode routine that, when the mode switch is set to the first mode, determines if no device is on the segment and, if no device is on the segment, prevents initiation of any of first set of routines.

13. The configuration device of claim 1, wherein the configuration routine includes an improper mode routine that, when the mode switch is set to the first mode, searches a set of specified device addresses associated with host devices on the segment and, if a device is at one of the specified device addresses, warns the user of a possible error.

14. A configuration device for use configuring a Foundation Fieldbus segment having one or more Fieldbus devices communicatively connected thereto, comprising:

a processor;

a memory;

a set of routines stored in the memory and adapted to be executed on the processor to perform device configuration changes to Fieldbus devices;

a communication stack adapted to communicate on the Fieldbus segment;

a configuration routine stored in the memory and adapted to be executed on the processor to initiate any of the set of routines to configure a Fieldbus device using the communication stack; and a communication routine stored in the memory and adapted to be executed on the processor to establish a communication relationship with the Fieldbus device without interrupting an established communication relationship between the Fieldbus device and another device attached to the Fieldbus segment.

15. The configuration device of claim 14, wherein the communication routine includes a first portion that determines the virtual communication relationship (VCR) entries available for use in the Fieldbus device and not being used by other devices, a second portion that selects one of the useable VCR entries and a third portion that establishes a communication link with the Fieldbus device using the selected VCR entry.

16. The configuration device of claim 15, wherein the communication routine further includes a fourth portion that determines if the communication link using the selected VCR entry is broken and, if so, causes operation of the first, second and third portions of the communication routine to establish a new communication link with the Fieldbus device.

17. The configuration device of claim 15, wherein the third portion uses a local selector to establish the communication link using the selected VCR entry.

18. The configuration device of claim 15, wherein the second portion is adapted to randomly select one of the useable VCR entries.

19. The configuration device of claim 14, wherein the set of routines includes at least one of a device configuration changing routine, a resource block modifying routine, a transducer block modifying routine, and a function block modifying routine.

20. The configuration device of claim 14, further including a display and a further routine stored on the memory and adapted to be executed on the processor to determine and display, via the display, configuration information of the Fieldbus device.

21. A configuration system for use in a device having a processor which configures a Foundation Fieldbus segment, comprising:

a memory;

a first set of routines stored in the memory and adapted to be executed on the processor to perform network configuration changes;

a second set of routines stored in the memory and adapted to be executed on the processor to perform device configuration changes without making network configuration changes;

a mode setting which may be set to a first mode or to a second mode; and a configuration routine stored in the memory and adapted to be executed on the processor to initiate any of the first set of routines or the second set of routines when the mode setting is the first mode to thereby configure the network and adapted to initiate any of the second set of routines but not any of the first set of routines when the mode setting is the second mode.

22. The configuration system of claim 21, further including a communication routine stored in the memory and adapted to be executed on the processor to establish communications with a Fieldbus device on the segment without interfering with communication links established with the Fieldbus device by other devices.

23. The configuration system of claim 22, wherein the communication routine includes a first portion that determines the virtual communication relationship (VCR) entries available for use in the Fieldbus device and not being used by other devices, a second portion that selects one of the useable VCR entries and a third portion that establishes a communication link using the selected VCR entry.

24. The configuration system of claim 23, wherein the third portion uses a local selector to establish the communication link using the selected VCR entry.

25. The configuration system of claim 23, wherein the communication routine further includes a fourth portion that determines if the communication link using the selected VCR entry is broken and, if so, causes operation of the first, second and third portions of the communication routine to establish a new communication link with the Fieldbus device.

26. The configuration system of claim 21, wherein the first set of routines includes at least one of a device tag assigning routine, a device address assigning routine, a function block scheduling routine and a downloading a communication schedule routine.

27. The configuration system of claim 21, wherein the second set of routines includes at least one of a device configuration changing routine, a resource block modifying routine, a transducer block modifying routine, and a function block modifying routine.

28. The configuration system of claim 21, wherein the configuration routine includes an improper mode routine that, when the mode setting is the first mode, determines if no device is on the segment and, if no device is on the segment, prevents initiation of any of the routines in the first set of routines.

29. The configuration system of claim 21, wherein the configuration routine includes an improper mode routine that, when the mode setting is the first mode, searches a set of specified device addresses associated with host devices on the segment and, if a device is at one of the specified device addresses, warns the user of a possible error.

* * * * *